(12) United States Patent
Algie

(10) Patent No.: US 7,447,228 B1
(45) Date of Patent: Nov. 4, 2008

(54) TECHNIQUE FOR DELIVERING BURSTED NATIVE MEDIA DATA FLOWS OVER AN ETHERNET PHYSICAL LAYER

(75) Inventor: Glenn Algie, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1105 days.

(21) Appl. No.: 10/254,861

(22) Filed: Sep. 26, 2002

Related U.S. Application Data

(60) Provisional application No. 60/364,024, filed on Mar. 15, 2002.

(51) Int. Cl.
H04L 5/22 (2006.01)

(52) U.S. Cl. .................... 370/433; 709/223

(58) Field of Classification Search ........... 370/389, 370/392, 400, 401, 433, 438, 390; 709/223–225
See application file for complete search history.

(56) References Cited

U.S. PATENT DOCUMENTS

| | | | |
|---|---|---|---|
| 6,141,355 A | 10/2000 | Palmer et al. | |
| 6,161,138 A * | 12/2000 | Gross et al. | 709/225 |
| 6,246,702 B1 | 6/2001 | Fellman et al. | |
| 6,760,308 B1 * | 7/2004 | Ghanma et al. | 370/235 |
| 6,980,520 B1 * | 12/2005 | Erimli | 370/236 |
| 7,031,343 B1 * | 4/2006 | Kuo et al. | 370/473 |
| 2003/0137975 A1 * | 7/2003 | Song et al. | 370/353 |
| 2003/0177215 A1 * | 9/2003 | Sutherland et al. | 709/223 |

FOREIGN PATENT DOCUMENTS

WO WO 01/93498 A2 12/2001

* cited by examiner

Primary Examiner—Wing F. Chan
Assistant Examiner—Duc T Duong
(74) Attorney, Agent, or Firm—Hunton & Williams LLP

(57) ABSTRACT

A technique for delivering bursted native media data flows over an Ethernet physical layer between a head-end and an outstation is disclosed. In one embodiment, the technique is realized by operating a device in a default bypass mode at the outstation; receiving a first command wherein the first command is one of a directed command and a multicast command to an address for exchanging Ethernet frames with an Ethernet physical layer; and receiving a second command wherein the second command is one of a multicast command and a directed command for exchanging native data flows with the Ethernet physical layer. The bursted native media data flows may be TDM data flows and the device may be a TDM device wherein the commands may be pause signals or burst signals.

20 Claims, 8 Drawing Sheets

TECHNIQUE FOR DELIVERING BURSTED NATIVE MEDIA DATA FLOWS OVER AN ETHERNET PHYSICAL LAYER

CROSS-REFERENCE TO RELATED APPLICATIONS

This patent application claims priority from U.S. Provisional Patent Application No. 60/364,024 filed Mar. 15, 2002, which is hereby incorporated by reference herein in its entirety.

FIELD OF THE INVENTION

The present invention relates generally to delivering bursted native media data flows and, more particularly, to a technique for delivering native time division multiplexing (TDM) data flows by a TDM Burst media access control device that resides between an Ethernet media access control and an Ethernet physical layer.

BACKGROUND OF THE INVENTION

Time Division Multiplexing is a scheme in which a plurality of signals are combined for transmission on a single communications line or channel. Each signal is broken up into a plurality of segments having a short duration. A circuit that combines signals at a source end of a communications link is known as a multiplexer. The multiplexer accepts input signals from a first plurality of end users, breaks each input signal into segments, and assigns the segments to a composite signal in a rotating, repeating sequence. Therefore, the composite signal contains data from each of the first plurality of end users. At a destination end, the composite signal is separated into the input signal segments by a circuit known as a demultiplexer. The separated input signal segments are then and routed to a second plurality of end users.

TDM data flows may be transmitted in a native format and bursted over a first mile Ethernet drop (one or multiple hops) along with regular Ethernet traffic. Bursting generally involves an intermittent asynchronous transmission of a specific amount of data.

Currently, packetization of TDM data flows is required for transmission. However, packetization of TDM data flow is costly per bit. Two current methods involve packetized Time Division Multiplexing over Internet Protocol (TDMoIP) and native TDM on physical layer (PHY) sideband.

For TDMoIP, packetizing TDM data flows requires greater hardware and software invested solutions thereby raising costs to first mile outstations (e.g., customer premise equipments). Further, clocking in TDMoIP requires extensive computing resources, such as multiple steps of packetization, latency and jitter dynamic input/output (i/o) buffering, encapsulation into User Datagram Protocol (UDP), Internet Protocol (IP) and Ethernet, and management overheads of associated tiered address space, for example. Therefore, TDMoIP is not cost effective or efficient for metro networking on Synchronous Optical Network (SONET).

For native TDM on PHY sideband, investments in an Ethernet PHY are required to support passthrough TDM sideband, as current PHYs will not support this functionality. Thus, a new PHY upgrade to existing systems is needed.

In view of the foregoing, it would be desirable to provide a technique for delivering native time division multiplexing bursted onto an Ethernet physical layer which overcomes the above-described inadequacies and shortcomings. More particularly, it would be desirable to provide a technique for delivering native time division multiplexing bursted onto an Ethernet physical layer in an efficient and cost effective manner.

SUMMARY OF THE INVENTION

According to the present invention, a technique for delivering native time division multiplexing bursted onto an Ethernet physical layer is provided. In one exemplary embodiment, the technique is realized by a method for delivering bursted native media data flows over an Ethernet physical layer between a head-end and an outstation, comprising the steps of: operating a device in a default bypass mode at the outstation; receiving a first command wherein the first command is one of a directed command and a multicast command to an address associated with the device for exchanging Ethernet frames with an Ethernet physical layer; and receiving a second command wherein the second command is one of a multicast command and a directed command for exchanging bursted native media data flows with the Ethernet physical layer.

In accordance with other aspects of this exemplary embodiment of the present invention, the method further comprises the steps loading downstream bytes from the head-end into an input of the device and sending bursted native media data flows upstream to the head-end from an output of the device; the input interfaces with a front end, wherein the bursted native media data flows are TDM data flows and the device is a TDM device; and the method further comprises the step of receiving a third command to the address for exchanging Ethernet frames during a bypass mode wherein the third command is a directed command wherein the commands are one of pause signals and burst signals.

In another exemplary embodiment, the technique is realized by a method for delivering bursted native media data flows over an Ethernet physical layer between a head-end and an outstation comprising the steps of: operating a device in a default bypass mode at the head-end; activating a signaling scheduler at the head-end for scheduling transmissions; receiving a first command wherein the first command is one of a directed command and a multicast command to an address associated with the device for exchanging Ethernet frames with an Ethernet physical layer; and receiving a second command wherein the second command is one of a multicast command and a directed command for exchanging bursted native media data flows with the Ethernet physical layer.

In accordance with other aspects of this exemplary embodiment of the present invention, the method further comprises the steps of loading upstream bytes from the outstation into an input of the device and sending bursted native media data flows downstream to the outstation from an output of the device; the input interfaces with a front end, wherein the bursted native media data flows are TDM data flows and the device is a TDM device; and the method further comprises the step of receiving a third command to the address for exchanging Ethernet frames during a bypass mode wherein the third command is a directed command; wherein the commands are one of pause signals and burst signals.

In another exemplary embodiment, the technique is realized by a computer signal embodied in a carrier wave readable by a computing system and encoding a computer program of instructions for executing a computer process performing the methods recited above.

In another exemplary embodiment, the technique is realized by a system for delivering bursted native media data flows over an Ethernet physical layer between a head-end and an outstation comprising: a device operating in a default bypass mode at the outstation; where the device receives a first command wherein the first command is one of a directed command and a multicast command to an address associated with the device for exchanging Ethernet frames; and an Ethernet physical layer for exchanging bursted native media data flows when a second command wherein the second command is one of a multicast command and a directed command is received at the device.

In accordance with other aspects of this exemplary embodiment of the present invention, the device further comprises: an input for receiving downstream bytes from the head-end and an output for sending bursted native media data flows upstream to the head-end; the input interfaces with a front end, wherein the bursted native media data flows are TDM data flows and the device is a TDM device; and the device receives a third command to the address for exchanging Ethernet frames during a bypass mode wherein the third command is a directed command; wherein the commands are one of pause signals and burst signals.

In another exemplary embodiment, the technique is realized by a system for delivering bursted native media data flows over an Ethernet physical layer between a head-end and an outstation comprising a device operating in a default bypass mode at the head-end; and a signaling scheduler at the head-end for scheduling transmissions; wherein the device receives a first command wherein the first command is one of a directed command and a multicast command to an address associated with the device for exchanging Ethernet frames with the Ethernet physical layer and receives a second command wherein the second command is one of a multicast command and a directed command for exchanging bursted native media data flows with the Ethernet physical layer.

In accordance with other aspects of this exemplary embodiment of the present invention, the system further comprises wherein the device further comprises an input for receiving upstream bytes from the outstation and an output for sending bursted native media data flows downstream to the outstation; the input interfaces with a front end, wherein the bursted native media data flows are TDM data flows and the device is a TDM device; and the device receives a third command to the address for exchanging Ethernet frames during a bypass mode wherein the third command is a directed command; wherein the commands are one of pause signals and burst signals.

In another exemplary embodiment, the technique is realized by an article of manufacture for delivering native data flows over an Ethernet physical layer between a head-end and an outstation comprising at least one processor readable carrier; and instructions carried on the at least one carrier; wherein the instructions are configured to be readable from the at least one carrier by at least one processor and thereby cause the at least one processor to operate so as to: operate a device in a default bypass mode at the outstation; receive a first command wherein the first command is one of a directed command and a multicast command to an address associated with the device for exchanging Ethernet frames with an Ethernet physical layer; and receive a second command wherein the second command is one of a multicast command and a directed command for exchanging bursted native media data flows with the Ethernet physical layer.

In another exemplary embodiment, the technique is realized by an article of manufacture for delivering native data flows over an Ethernet physical layer between a head-end and an outstation, the article of manufacture comprising: at least one processor readable carrier; and instructions carried on the at least one carrier; wherein the instructions are configured to be readable from the at least one carrier by at least one processor and thereby cause the at least one processor to operate so as to: operate a device in a default bypass mode at the head-end; activate a signaling scheduler at the head-end for scheduling transmissions; receive a first command wherein the first command is one of a directed command and a multicast command to an address associated with the device for exchanging Ethernet frames with an Ethernet physical layer; and receive a second command wherein the second command is one of a multicast command and a directed command for exchanging bursted native media data flows with the Ethernet physical layer.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

The present invention provides an efficient method for carrying bursted native media data flows over a standard Ethernet point-to-point (pt-pt) physical layer (PHY) by introducing a TDM Burst Media Access Control (MAC) device that resides between a Standard Ethernet MAC and a Standard Ethernet PHY. The Standard Ethernet MAC and TDM Burst MAC each have unique MAC addresses. The TDM Burst MAC allows unframed native TDM data flows to be bursted onto an Ethernet First Mile (EFM) where packetization of TDM is avoided. According to an embodiment of the present invention, burst grants for TDM and Ethernet flows may be signaled using 802.3x pause signals in a predetermined sequence. According to another embodiment of the present invention, burst signals may be implemented in place of pause signals to signal burst grants.

Figure 1:
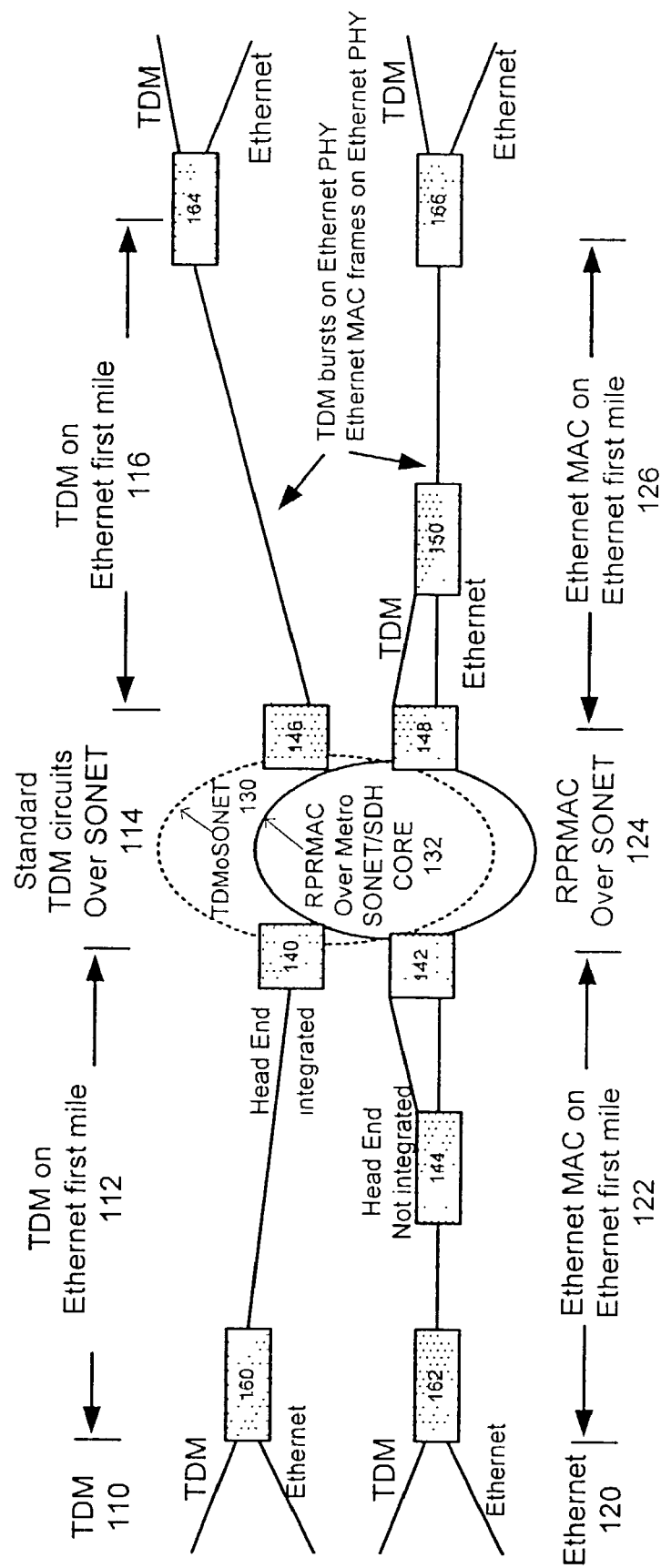
FIG. 1 is a system for delivering bursted native media data flows over an Ethernet first mile in accordance with the present invention.

FIG. 1 is a system for delivering bursted native media data flows over a first mile Ethernet in accordance with the present invention. Bursted native media data flows may refer to TDM data flows, video data flows and/or any other digitized byte-oriented stream, etc. For example, the present invention supports a technique for efficiently transporting TDM data flows over a SONET network via native Ethernet first mile metro extensions. TDM/SDH may also be supported by an embodiment of the present invention. While TDM data flows are discussed in exemplary embodiments, other bursted native media data flows may be implemented in accordance with the embodiments of the present invention. TDM data flows may be carried natively rather than adding packetizing resources. A TDM data flow may be bursted onto Ethernet first mile hops where a second hop may be SONET. Standard 802.3x pause signals may be used for a burst cycle. In addition, burst signals may be used for a burst cycle. Bursted TDM data flows may interwork into a metro Optical Ethernet (OE) on SONET to a standard TDM on SONET (TDMoSONET) 130. Interwork refers to connecting at least two types of media at a point in a network that connects a first layer to a second layer, such as 140, 142, 146 and 148.

As shown in FIG. 1, head-end devices may be integrated (e.g., 140, 146) or not-integrated (e.g., 142 and 144, 148 and 150). Nodes 160, 162, 164, 166 may transmit/receive TDM data flows and Ethernet frames. Head-end devices generally represent a point of presence (POP) location, which may be controlled by a central office. For example, a head-end device may include a wiring closet or an extension of a central office used by a metro provider. Nodes may include circuits or other device with a TDM interface and an Ethernet interface. Native TDM data flows may feed into a TDMoSONET 130. Ethernet frames may feed into Resilient Packet Ring Media Access Control (RPRMAC) or Ethernet over SONET (EOS) using X.86 or generic framing protocol (GFP) encapsulation techniques or other techniques. For example, as Synchronous Optical Network/Synchronous Data Hierarchy (SONET/SDH) is available in a core of a metro network 132, TDM data flows may be passed a hop or two and interworked into a standard TDMoSONET 130. For TDM transmissions, as shown by 110, TDM data flows may burst on EFM as represented by 112 and 116, where first mile transmission are fed into standard TDM circuits over SONET 114. For Ethernet transmissions, as shown by 120, Ethernet frames on EFM are represented by 122 and 126, where first mile transmissions are fed to RPRMAC over SONET 124. TDM data flows bursted on Ethernet PHY and Ethernet frames on Ethernet PHY may be supported at an EFM.

Figure 2:
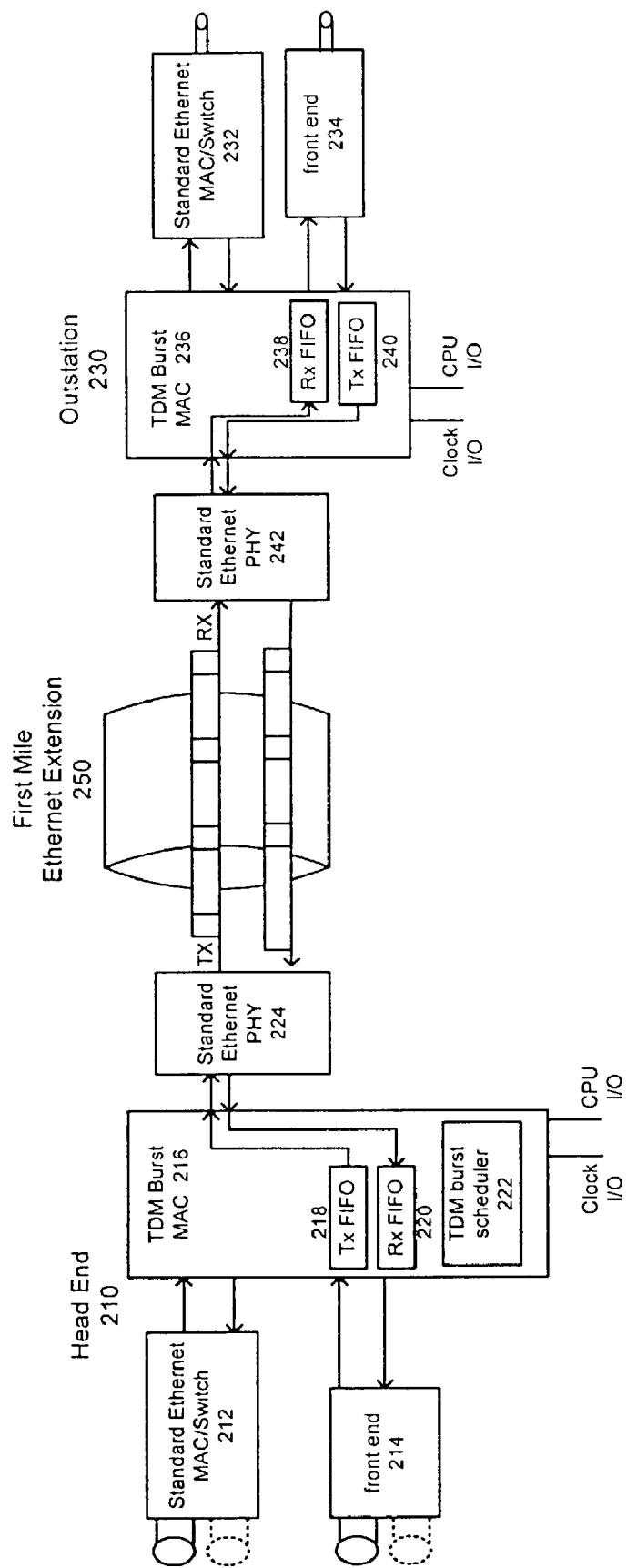
FIG. 2 is a system for supporting head-end to outstation TDM burst operations in accordance with the present invention.

FIG. 2 is a system for supporting head-end 210 to outstation 230 TDM burst operations in accordance with the present invention. An outstation generally represents a customer premise equipment. At head-end 210, TDM Burst MAC 216 is positioned between Standard Ethernet MAC/Switch 212 and Standard Ethernet PHY 224. When TDM Burst MAC 216 operates in a default bypass mode, Standard Ethernet PHY 224 is in communication with Standard Ethernet MAC/Switch 212. When TDM Burst MAC 216 is in an "on" position, Standard Ethernet PHY 224 is in communication with front end 214 via Transmit (Tx) First In First Out (FIFO) 218 and Receive (Rx) FIFO 220. At head-end 210, TDM Burst MAC 216 also supports a TDM burst scheduler 222 for scheduling pause signals (or burst signals) as well as TDM burst transmissions. TDM Burst scheduler 222 may be integrated with TDM Burst MAC 216. In addition, TDM Burst scheduler 222 may function as a separate software layer, decoupled from TDM Burst MAC 216. Ethernet frames may interwork to RPRMAC over SONET, X.86 EOS (or generic framing protocol), and/or native Ethernet. TDM may interwork to TDMoSONET 130, TDM Burst MAC ((pt-pt), point to consecutive point timeslotting (pt-cpt), or point to multipoint timeslotting (pt-mpt)) and other ring and/or mesh options.

At a First Mile Ethernet Extension 250, Standard Ethernet PHY 224 and Standard Ethernet PHY 242 transmit and receive Ethernet frames and TDM data flows in accordance with pause signals in a predetermined sequence. In another example, burst signals may be implemented in place of pause signals.

At outstation 230, TDM Burst MAC 236 is positioned between Standard Ethernet MAC/Switch 232 and Standard Ethernet PHY 242. When TDM Burst MAC 236 operates in a default bypass mode, Standard Ethernet PHY 242 is in communication with Standard Ethernet MAC/Switch 232. When TDM Burst MAC 236 is in an "on" position, Standard Ethernet PHY 242 is in communication with front end 234 via Rx FIFO 238 and Tx FIFO 240.

The present invention leverages Standard Ethernet PHY layers and Standard Ethernet MAC layers to integrate a TDM Burst MAC between these layers at an EFM when TDM transport is desired by an end user. This approach avoids redesigning and/or restructuring existing Ethernet structures.

The present invention integrates a TDM Burst MAC that has a default bypass mode and resides between a Standard Ethernet MAC and a Standard Ethernet PHY, such as 10/100 Media Independent Interface (MII), Gigabit Ethernet (GigE) Serdes, Gigabit Ethernet Interface Card (GBIC), Gigabit MII (GMII) or other hardware connecting a Standard Ethernet MAC to a Standard Ethernet PHY.

With dynamic control data, alignment may be timed between two endpoints or multiple linear cascaded endpoints on the EFM (where each endpoint is equipped with a TDM BURST MAC) to a regular burst window in a time domain where a set of steps described below in FIG. 6 occur per burst cycle. This control data may be signaled at a per burst cycle or as burst events of the Standard Ethernet MAC. In addition, the TDM burst MAC may be remotely managed by a Simple Network Management Protocol (SNMP) type provisioning control, for example.

The present invention may be implemented as an upstream operation at an outstation or at an intermediate cascaded node (e.g., towards a network, rather than towards an end user). For example, downstream burst control may be reflected upstream at an outstation where source/destination MAC addresses are updated as appropriate.

Figure 3:
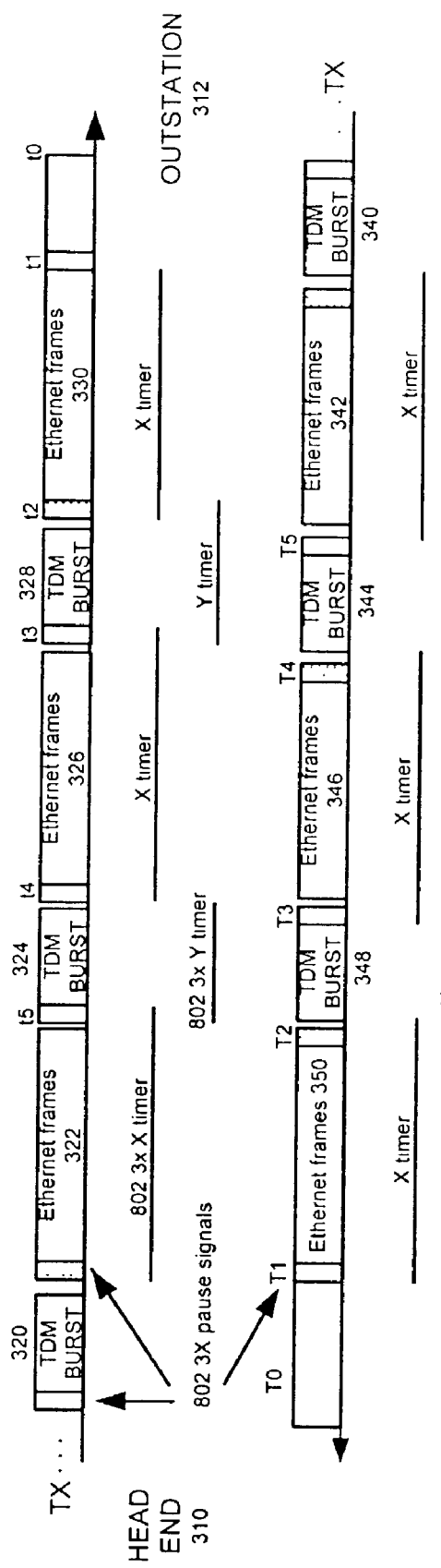
FIG. 3 shows downstream and upstream TDM bursting in accordance with the present invention.

FIG. 3 shows downstream and upstream TDM bursting in accordance with the present invention. X timer represents a 802.3x directed pause of X time to a destination MAC address of TDM Burst MAC. Y timer represents a 802.3x multicast pause of Y time to a 802.3x multicast address. The X timer is processed by a TDM Burst MAC, such as 216 and 236, and the Y timer is processed by a Standard Ethernet MAC, such as 212 and 232 of FIG. 2.

Time t0 to t1 represents an initialization stage where TDM Burst MAC operates in a bypass mode. Upon receipt of a directed pause to a TDM Burst MAC address at time t1 at outstation 312, TDM Burst MAC operates in a bypass mode during a 802.3x pause time having value X. Ethernet frames 330 are transmitted until X timer pops at time t2. X may have an additional guard band time Gx.

Upon receipt of a multicast pause at a Standard Ethernet MAC at time t2, Ethernet MAC runs in a disabled mode during a 802.3x pause time having value Y. TDM Burst MAC transmits native TDM Burst 328 to/from Ethernet PHY until Y timer pops at time t3. Y timer may have an additional guard band time Gy. From time t3 to t4, Standard Ethernet MAC transmits Ethernet frames 326 to/from Ethernet PHY. At time t4, another multicast pause may be received to disable Standard Ethernet MAC. From time t4 to t5, TDM Burst MAC transmits TDM data flows (e.g., TDM bursts 324) until Y timer pops at time t5.

As shown in FIG. 3, T1, T2, T3, etc. are reflections of a t1, t2, t3, etc. pattern where source/destination MAC addresses are updated appropriately.

According to another embodiment of the present invention, burst signals may be used in place of pause signals, as shown in FIG. 3 above. In this embodiment, burst signals may represent an "on" signal while a pause signal may represent an "off" signal. Timer X in a burst signal may represent a time for Ethernet MAC to burst and timer Y in a burst signal may represent a time for TDM Burst MAC to send, which may be directed to one or more MAC addresses appropriately. A burst signal may also comprise a transmit duration for indicating how long a transmission will last. By implementing burst signals, guard band time may be minimized since a transmitting outstation, for example, may accurately shut down upstream, rather than additionally having to potentially spool a maximum size packet. By minimizing guard band time, efficiency is further enhanced. Implementing burst signals in place of pause signals is discussed in PCT Application No. PCT/GB01/02395 (Publication No. WO01/93498), filed May 25, 2001, which is incorporated by reference in its entirety.

Figure 4:
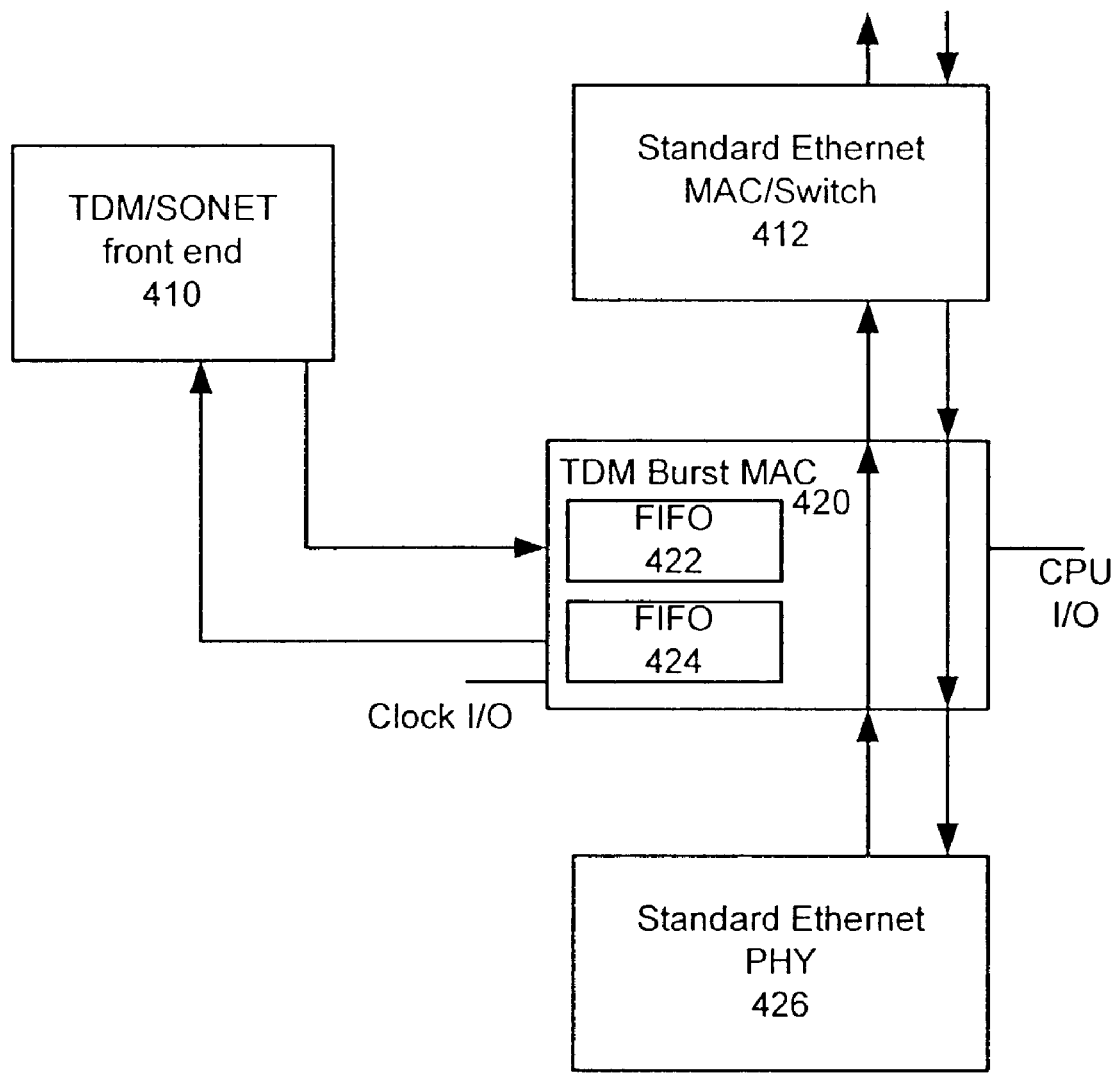
FIGS. 4 and 5 illustrate an Ethernet First Mile transport side at an outstation for supporting a TDM Burst MAC in accordance with the present invention.
Figure 5:
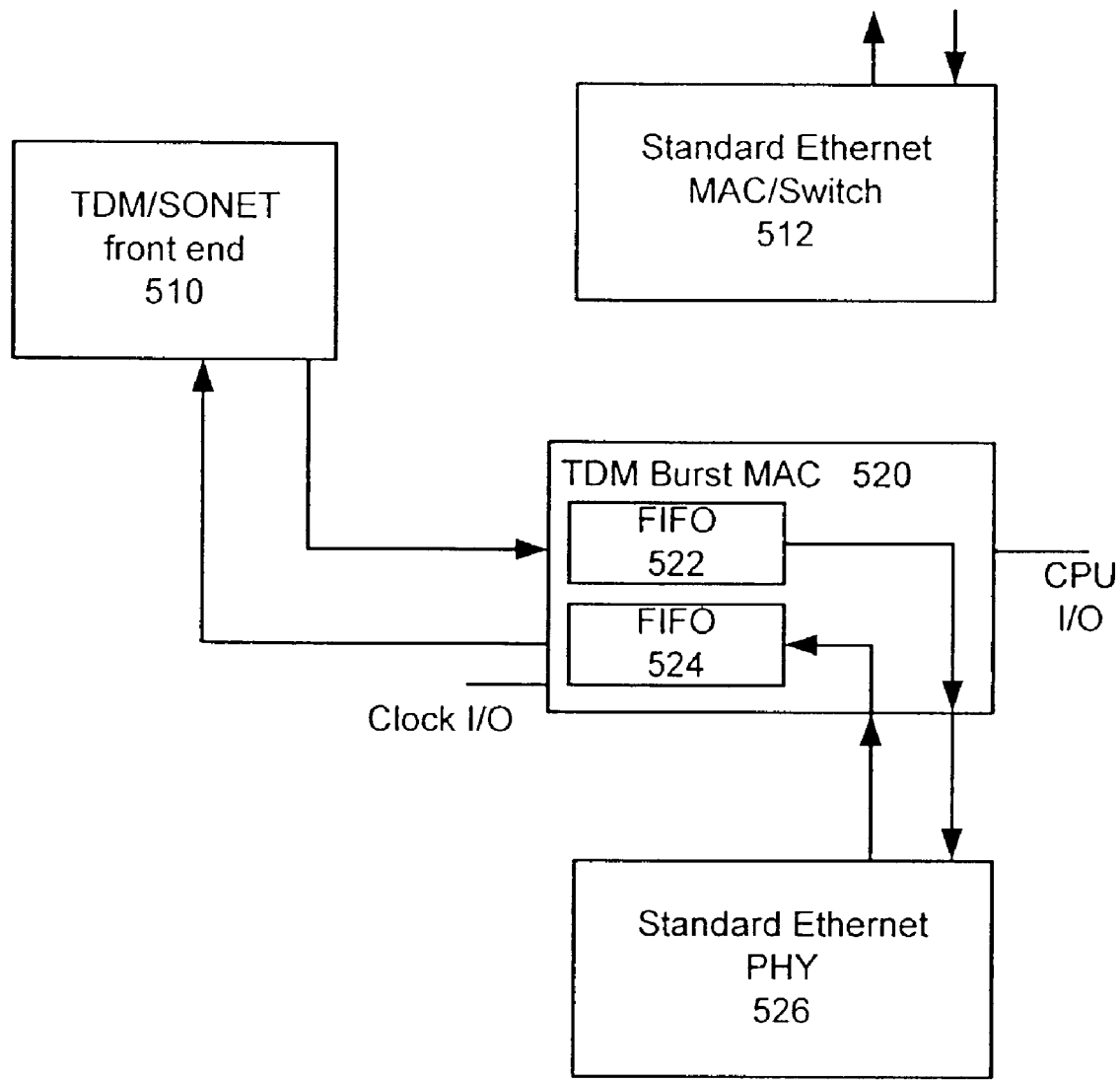

FIGS. 4 and 5 illustrate an Ethernet First Mile transport side at an outstation for supporting a TDM Burst MAC in accordance with the present invention. FIG. 4 illustrates a TDM Burst MAC 420 operating in a default bypass mode. The TDM Burst MAC 420 enables exchange of Ethernet frames between Standard Ethernet PHY 426 and Standard Ethernet MAC/Switch 412. During bypass mode, TDM/SONET front end 410 is disabled. This mode may operate during a TDM Burst MAC 802.3x pause timer (e.g., directed pause with X timer). Additionally, TDM transmit paths do not have to be synchronized with TDM receive paths.

FIG. 5 illustrates a TDM Burst MAC 520 operating in a TDM burst mode. TDM Burst MAC 520 enables transmission of TDM data flows (or TDM bursts) between Standard Ethernet PHY 526 and a TDM/SONET front end 510 via FIFO 522 and FIFO 524. During TDM burst mode, Standard Ethernet MAC/Switch 512 is disabled. This mode may operate during a Ethernet MAC 802.3x pause timer (e.g., multicast pause with Y timer).

Figure 6:
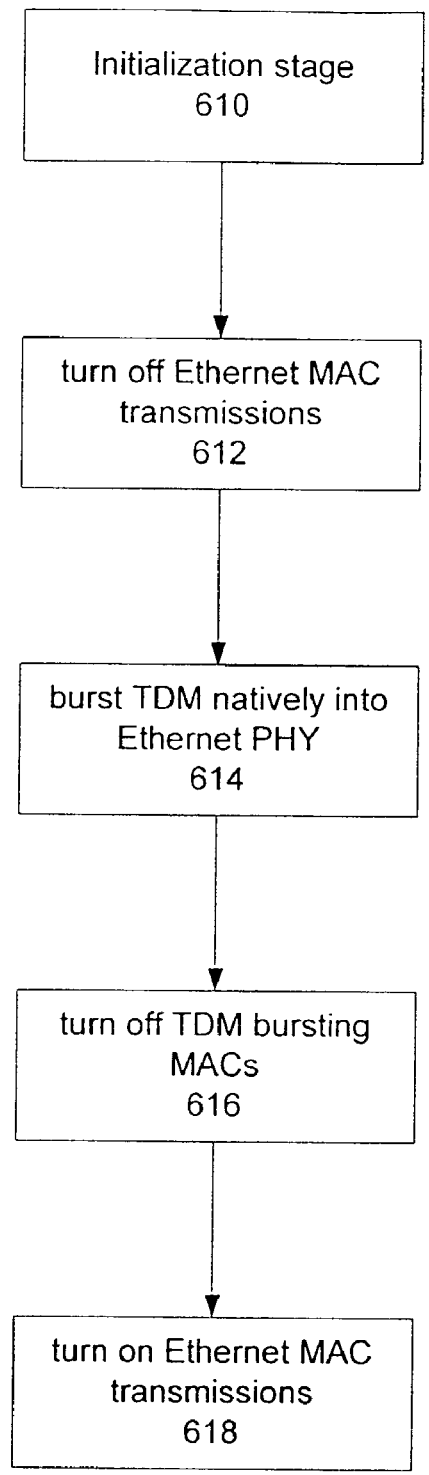
FIG. 6 is a flowchart for bursting TDM over Ethernet PHY in accordance with the present invention.

FIG. 6 is a flowchart for bursting TDM over Ethernet PHY in accordance with the present invention. At step 610, an initialization stage supports TDM Burst MAC in a default bypass mode. The TDM Burst MAC may be initialized to a normally off mode where a first directed pause to a TDM Burst MAC address may be received for transmission of Ethernet frames.

At step 612, Ethernet MAC transmissions may be turned off by using a 802.3x multicast pause signal with a timer value. The timer value may represent a time period for running the TDM Burst MAC plus an additional guard band time.

At step 614, TDM data flows may be bursted natively into an Ethernet PHY. The first directed pause signal pops thereby signaling TDM data flows to transmit. The multicast pause signal turns on the TDM Burst MAC to enable native TDM data flows stored in a buffer to burst at an Ethernet link speed into the Ethernet PHY.

At step 616, the TDM Burst MAC is turned off. TDM Burst MAC may be turned off by sending a second directed pause to a TDM Burst MAC address, along with an off timer value. In addition, a locally provisioned or fixed time value may be used to turn off the TDM Burst MAC. In another example, the multicasted timer may pop to switch off the TDM burst function and re-enable the bypass mode of the TDM Burst MAC.

At step 618, Ethernet MAC transmissions are turned on. When the multicast pause signal pops, a Standard Ethernet MAC resumes a normally on condition. The TDM Burst MAC is off and operates in a default bypass mode.

At a metro OE/SONET edge, the receiving TDM Burst MAC may spool the native TDM data flow directly into a SONET/SDH payload setup per a provisioning procedure.

Figure 7:
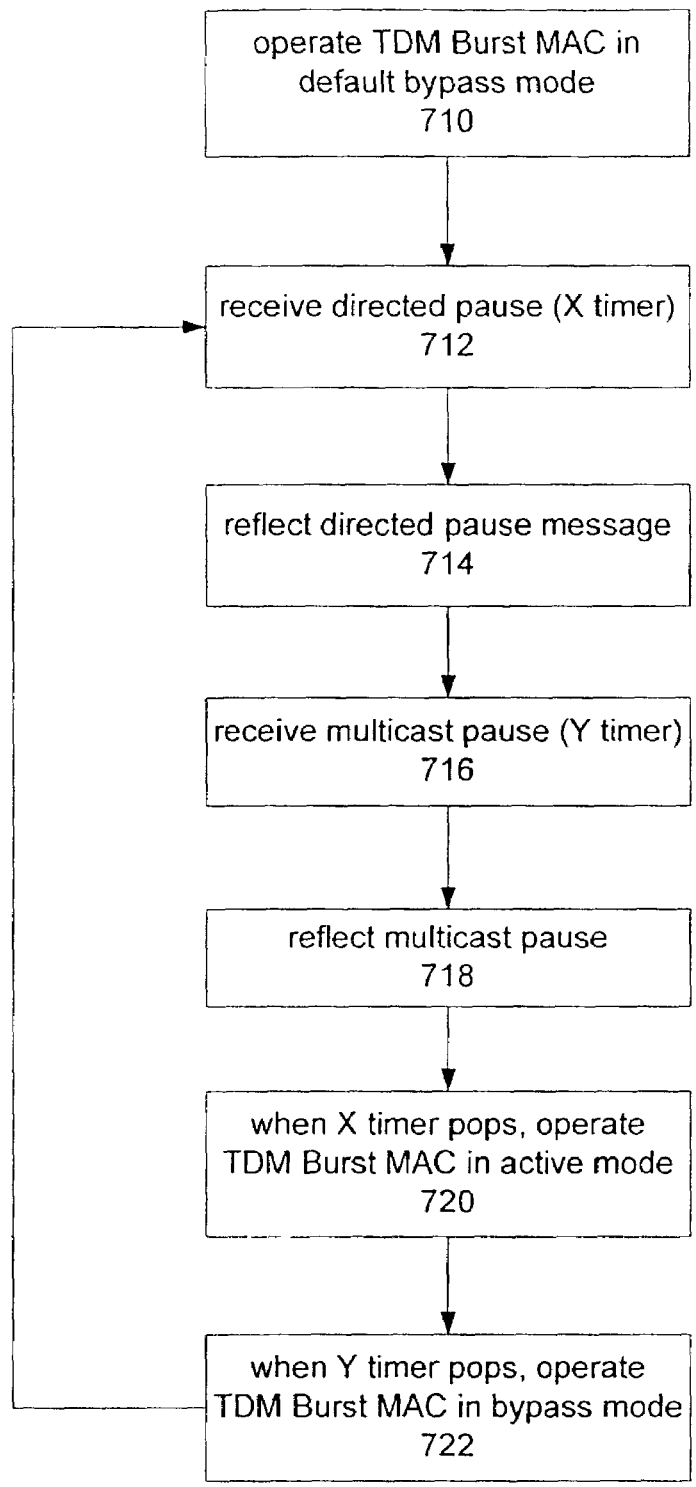
FIG. 7 is a flowchart for outstation processing of TDM data flows in accordance with the present invention.

FIG. 7 is a flowchart for outstation processing of TDM data flows in accordance with the present invention. As discussed above, burst signals may be incorporated in place of pause signals. At step 710, a TDM Burst MAC operates in a default bypass mode where Ethernet frames are passed through to a Standard Ethernet MAC/Switch during time t0 to t1. At step 712, a directed pause to a TDM Burst MAC address may be received at time t1. A timer value of X timer is loaded to keep the TDM Burst MAC in bypass mode until X timer pops at time t2. At step 714, a directed pause message containing information related to duration and other qualities associated with the directed pause is reflected upstream towards a head-end and directed to a head-end TDM Burst MAC address.

At step 716, prior to the X timer popping, a 802.3x multicast pause with a Y timer value is received at time t2. At step 718, a multicast pause message containing information related to duration and other qualities associated with the multicast pause is reflected to a head-end with an updated source address (SA). An outstation Standard Ethernet MAC disables during Y timer. At step 720, when the X timer pops, the TDM Burst MAC feeds downstream/receive bytes from the head-end into a Rx FIFO and sends Tx FIFO TDM bursts upstream to the head-end during time t2 to t3. The Rx FIFO transmits the data to a TDM/SONET interface at a line rate.

At step 722, when the Y timer pops at time t3, the Tx FIFO and Fx FIFO will stop feeding data to the TDM Burst MAC. Thus, the TDM Burst MAC operates in a bypass mode. A TDM burst cycle may start again at step 712, where another directed pause may be received at time t3.

Figure 8:
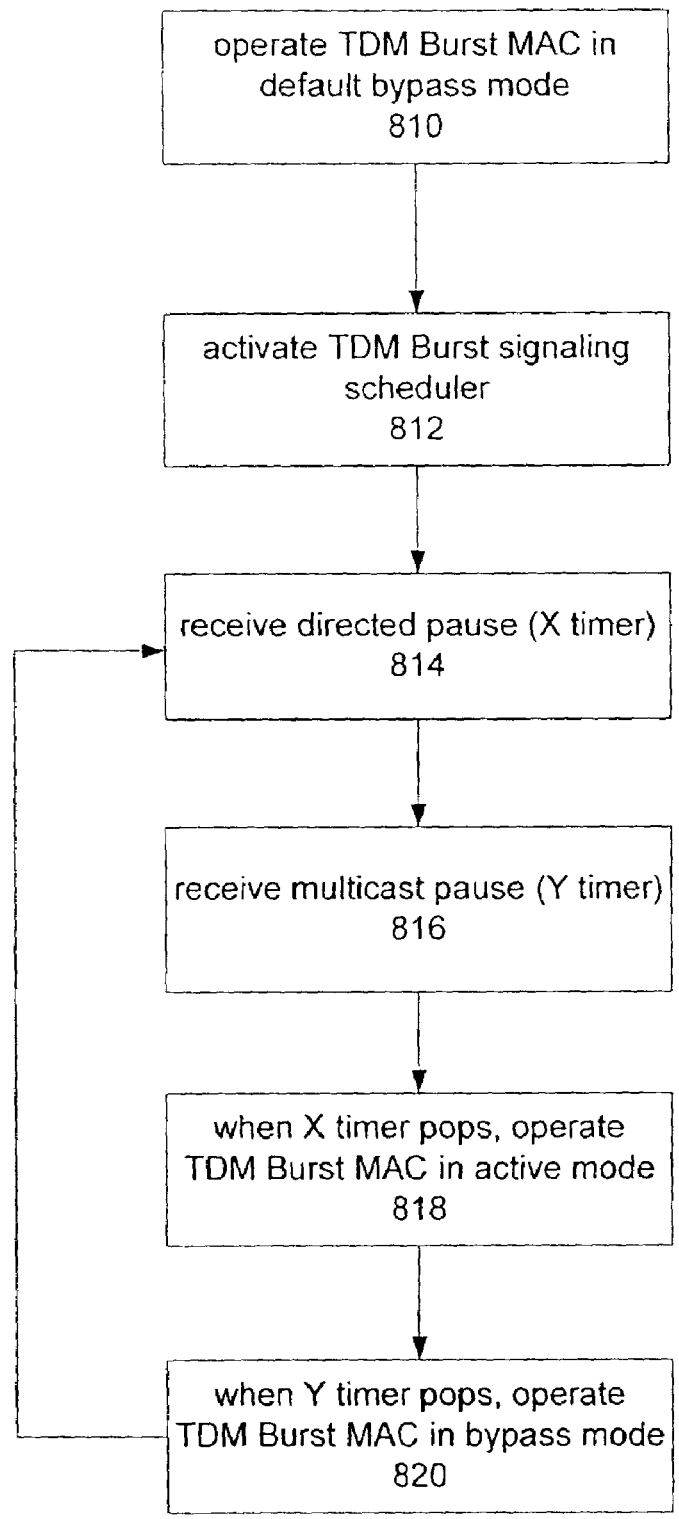
FIG. 8 is a flowchart for head-end processing of TDM data flows in accordance with the present invention.

FIG. 8 is a flowchart for head-end processing of TDM data flows in accordance with the present invention. At step 810, a TDM Burst MAC operates in a default bypass mode where Ethernet frames are passed through to a Standard Ethernet MAC/Switch at time T0. At step 812, a TDM Burst scheduler may be activated. The TDM Burst scheduler specifies a burst schedule of pause signals. At step 814, a directed pause to a TDM Burst MAC address may be received at time T1. A timer value of X timer is loaded to keep the TDM Burst MAC in bypass mode until X timer pops at time T2. The directed pause may be a reflection of a directed pause from an outstation, with an updated SA of the TDM Burst MAC.

At step 816, prior to the X timer popping, a 802.3x multicast pause with a Y timer value is received at time T2. The multicast pause may be a reflection of a multicast pause from an outstation, with an updated SA of the Ethernet MAC address. Head-end Standard Ethernet MAC disables during Y timer. At step 818, when X timer pops at time T2, the TDM Burst MAC feeds upstream/receive bytes from the outstation into a Rx FIFO and sends Tx FIFO TDM bursts downstream to the outstation during time T2 to T3, as shown by TDM Burst 348. The Rx FIFO transmits the data to a TDM/SONET interface at a line rate.

At step 820, when the Y timer pops at time T3, the Tx FIFO and Fx FIFO will stop feeding data to the TDM Burst MAC. Thus, the TDM Burst MAC operates in a bypass mode during time T3 to T4. A TDM burst cycle may start again at step 814, where another directed pause may be received at time T3.

The inventive aspects discussed above in relation to TDM data flows may be further applied to any byte stream media or other type of media. For example, other bursted native media data flows including TDM data flows, video data flows and/or any other digitized byte-oriented stream may be implemented by the present invention. In addition, the inventive aspects discussed above may be applied to a linear add/drop collector architecture (e.g., point to consecutive point) where Ethernet frames may be dropped into burst signal controlled timeslots.

At this point it should be noted that multiplexing TDM data flows into an Ethernet physical layer in accordance with the present invention as described above typically involves the processing of input data and the generation of output data to some extent. This input data processing and output data generation may be implemented in hardware or software. For example, specific electronic components may be employed in a Ethernet first mile or similar or related circuitry for implementing the functions associated with multiplexing TDM data flows into an Ethernet physical layer in accordance with the present invention as described above. Alternatively, one or more processors operating in accordance with stored instructions may implement the functions associated multiplexing TDM data flows into an Ethernet physical layer in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for delivering bursted native media data flows over an Ethernet physical layer between a head-end and an outstation, the method comprising the steps of:
    operating a device in a default bypass mode at the outstation;
    receiving a first command wherein the first command is one of a directed command and a multicast command to an address associated with the device for exchanging Ethernet frames with an Ethernet physical layer; and
    receiving a second command wherein the second command is one of a multicast command and a directed command for exchanging bursted native media data flows with the Ethernet physical layer.

2. The method of claim 1, the step of receiving the second command further comprising the steps of:
    loading downstream bytes from the head-end into an input of the device; and
    sending bursted native media data flows upstream to the head-end from an output of the device.

3. The method of claim 2, wherein the input interfaces with a front end, wherein the bursted native media data flows are TDM data flows and the device is a TDM device.

4. The method of claim 1, further comprising the step of:
    receiving a third command to the address for exchanging Ethernet frames during a bypass mode wherein the third command is a directed command;
    wherein the commands are one of pause signals and burst signals.

5. A method for delivering bursted native media data flows over an Ethernet physical layer between a head-end and an outstation, the method comprising the steps of:
    operating a device in a default bypass mode at the head-end;
    activating a signaling scheduler at the head-end for scheduling transmissions;
    receiving a first command wherein the first command is one of a directed command and a multicast command to an address associated with the device for exchanging Ethernet frames with an Ethernet physical layer; and
    receiving a second command wherein the second command is one of a multicast command and a directed command for exchanging bursted native media data flows with the Ethernet physical layer.

6. The method of claim 5, wherein the step of receiving the second command further comprising the steps of:
    loading upstream bytes from the outstation into an input of the device; and
    sending bursted native media data flows downstream to the outstation from an output of the device.

7. The method of claim 6, wherein the input interfaces with a front end, wherein the bursted native media data flows are TDM data flows and the device is a TDM device.

8. The method of claim 5, further comprising the step of:
    receiving a third command to the address for exchanging Ethernet frames during a bypass mode wherein the third command is a directed command;
    wherein the commands are one of pause signals and burst signals.

9. A computer readable media storing code to perform the steps of the method recited in claim 1.

10. A computer readable media storing code to perform the steps of the method recited in claim 5.

11. A system for delivering bursted native media data flows over an Ethernet physical layer between a head-end and an outstation, the system comprising:
    a device operating in a default bypass mode at the outstation; where the device receives a first command wherein the first command is one of a directed command and a multicast command to an address associated with the device for exchanging Ethernet frames; and
    an Ethernet physical layer for exchanging bursted native media data flows when a second command wherein the second command is one of a multicast command and a directed command is received at the device;
    wherein the device receives a third command to the address for exchanging Ethernet frames during a bypass mode wherein the third command is a directed command; wherein the commands are one of pause signals and burst signals.

12. The system of claim 11, wherein the device further comprises:
    an input for receiving downstream bytes from the head-end; and
    an output for sending bursted native media data flows upstream to the head-end.

13. The system of claim 12, wherein the input interfaces with a front end, wherein the bursted native media data flows are TDM data flows and the device is a TDM device.

14. The system of claim 11, wherein the device receives a third command to the address for exchanging Ethernet frames during a bypass mode wherein the third command is a directed command; wherein the commands are one of pause signals and burst signals.

15. A system for delivering bursted native media data flows over an Ethernet physical layer between a head-end and an outstation, the system comprising:
- a device operating in a default bypass mode at the head-end; and
- a signaling scheduler at the head-end for scheduling transmissions;
- wherein the device receives a first command wherein the first command is one of a directed command and a multicast command to an address associated with the device for exchanging Ethernet frames with the Ethernet physical layer and receives a second command wherein the second command is one of a multicast command and a directed command for exchanging bursted native media data flows with the Ethernet physical layer;
- wherein the device receives a third command to the address for exchanging Ethernet frames during a bypass mode wherein the third command is a directed command; wherein the commands are one of pause signals and burst signals.

16. The system of claim 15, wherein the device further comprises:
- an input for receiving upstream bytes from the outstation; and
- an output for sending bursted native media data flows downstream to the outstation.

17. The system of claim 16, wherein the input interfaces with a front end, wherein the bursted native media data flows are TDM data flows and the device is a TDM device.

18. The system of claim 15, wherein the device receives a third command to the address for exchanging Ethernet frames during a bypass mode wherein the third command is a directed command; wherein the commands are one of pause signals and burst signals.

19. An article of manufacture for delivering bursted native media data flows over an Ethernet physical layer between a head-end and an outstation, the article of manufacture comprising:
- at least one processor readable media; and
- instructions stored on the at least one media;
- wherein the instructions are configured to be readable from the at least one media by at least one processor and thereby cause the at least one processor to operate so as to:
- operate a device in a default bypass mode at the outstation;
- receive a first command wherein the first command is one of a directed command and a multicast command to an address associated with the device for exchanging Ethernet frames with an Ethernet physical layer; and
- receive a second command wherein the second command is one of a multicast command and a directed command for exchanging bursted native media data flows with the Ethernet physical layer.

20. An article of manufacture for delivering bursted native media data flows over an Ethernet physical layer between a head-end and an outstation, the article of manufacture comprising:
- at least one processor readable media; and
- instructions stored on the at least one media;
- wherein the instructions are configured to be readable from the at least one media by at least one processor and thereby cause the at least one processor to operate so as to:
- operate a device in a default bypass mode at the head-end;
- activate a signaling scheduler at the head-end for scheduling transmissions;
- receive a first command wherein the first command is one of a directed command and a multicast command to an address associated with the device for exchanging Ethernet frames with an Ethernet physical layer; and
- receive a second command wherein the second command is one of a multicast command and a directed command for exchanging bursted native media data flows with the Ethernet physical layer.

* * * * *